United States Patent
Li et al.

(10) Patent No.: US 10,651,498 B2
(45) Date of Patent: May 12, 2020

(54) SECONDARY BATTERY AND VEHICLE

(71) Applicant: Contemporary Amperex Technology Co., Limited, Ningde (CN)

(72) Inventors: Xiang Li, Ningde (CN); Chengyou Xing, Ningde (CN); Peng Wang, Ningde (CN); Rulai Cai, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 73 days.

(21) Appl. No.: 16/167,738

(22) Filed: Oct. 23, 2018

(65) Prior Publication Data
US 2019/0221877 A1 Jul. 18, 2019

(30) Foreign Application Priority Data
Jan. 12, 2018 (CN) .......................... 2018 1 0031647

(51) Int. Cl.
*H01M 10/04* (2006.01)
*H01M 2/22* (2006.01)
(Continued)

(52) U.S. Cl.
CPC .......... *H01M 10/045* (2013.01); *H01M 2/04* (2013.01); *H01M 2/22* (2013.01); *H01M 2/26* (2013.01);
(Continued)

(58) Field of Classification Search
CPC ........ H01M 10/045; H01M 2/22; H01M 2/26; H01M 2/04; H01M 2/30
See application file for complete search history.

(56) References Cited

U.S. PATENT DOCUMENTS

2012/0142230 A1* 6/2012 Baek .................. H01M 2/22
439/754
2015/0364742 A1* 12/2015 Kim .................... H01M 10/04
429/53
(Continued)

FOREIGN PATENT DOCUMENTS

EP 2187466 A1 5/2010

OTHER PUBLICATIONS

European Search Report for European application No. EP18189993, dated Dec. 17, 2018, 7 pages.

*Primary Examiner* — Stewart A Fraser
(74) *Attorney, Agent, or Firm* — Kowert Hood Munyon Rankin and Goetzel PC; Jeffrey C. Hood (57) ABSTRACT

The present disclosure relates to technical field of energy storage devices, and in particular, to a secondary battery and a vehicle. The secondary battery includes a top cover plate, electrode terminals disposed on the top cover plate, at least one electrode assembly including a main body and a plurality of conductive portions extending from the main body. The plurality of conductive portions is stacked and forms a tab, and the main body is formed by winding a first electrode plate, a second electrode plate and a separator disposed between the first electrode plate and the second electrode plate. The secondary battery also includes connecting pieces for connecting the tab to the electrode terminal. The tabs extend from one side of the main body viewed in thickness direction and are bent with respect to height direction and is connected to the connecting piece.

15 Claims, 9 Drawing Sheets

(51) Int. Cl.
*H01M 2/26* (2006.01)
*H01M 2/04* (2006.01)
*H01M 2/30* (2006.01)

(52) U.S. Cl.
CPC .......... *H01M 2/30* (2013.01); *H01M 2220/20* (2013.01)

(56) References Cited

U.S. PATENT DOCUMENTS

| | | |
|---|---|---|
| 2016/0036009 A1 | 2/2016 | Cho et al. |
| 2016/0099444 A1 | 4/2016 | Park et al. |
| 2017/0207437 A1* | 7/2017 | Guo .................. H01M 2/24 |
| 2018/0337389 A1* | 11/2018 | Hirose ................ H01M 2/22 |
| 2019/0123313 A1* | 4/2019 | Guo .................. H01M 2/0426 |

* cited by examiner

SECONDARY BATTERY AND VEHICLE

CROSS-REFERENCE TO RELATED APPLICATIONS

The present disclosure claims priority to Chinese Patent Application No. 201810031647.9, filed on Jan. 12, 2018, the content of which is incorporated herein by reference in its entirety.

TECHNICAL FIELD

The present disclosure relates to the technical field of energy storage devices, and in particular, to a secondary battery and a vehicle.

BACKGROUND

Secondary batteries are widely used in electronic devices such as mobile phones, notebook computers and the like due to high energy density and environmental friendliness. In recent years, in response to environmental issues, issues of gasoline price and energy storage, application of secondary batteries has rapidly expanded to hybrid vehicles, electric vehicles, and energy storage systems.

An electrode assembly of a conventional secondary battery includes a main body and a tab connected to the main body. The main body is usually wound as a multi-circle structure, and two tabs are provided in each circle. When the tab of such structure is connected to a connecting piece of the secondary battery after being bent, a misalignment of ends of the tab may be caused by its bending. A degree of misalignment of the tab at the outermost side is the greatest, when compared with the tab at the innermost side. Besides, the thicker the tab is, the greater the degree of misalignment is. If the tab is too short, it may causes that the tab at the outermost side cannot be connected to the connecting piece. If the tab is too long, it may lead to a great redundancy of the tab at the innermost side formed after the bending, which is likely to result in a connection between the tab and other components in the secondary battery and thus causes an internal short-circuit of the secondary battery, thereby further causing an accident.

SUMMARY

The present disclosure provides a secondary battery and a vehicle that can solve the above problems. A first aspect of the present disclosure provides a secondary battery. The secondary battery includes a top cover plate, an electrode terminal disposed on the top cover plate, and at least one electrode assembly. Each of the at least one electrode assembly includes a main body and a plurality of conductive portions extending from the main body. The plurality of conductive portions is stacked and forms a tab, and the main body is formed by winding a first electrode plate, a second electrode plate, and a separator disposed between the first electrode plate and the second electrode plate. The secondary battery further includes a connecting piece for connecting the tab to the electrode terminal. The tab extends from a side of the main body viewed in a thickness direction of the secondary battery, and the tab is bent with respect to a height direction of the secondary battery and connected to the connecting piece.

Optionally, the tab includes a connecting portion for main body connected to the main body, an extending portion connected to the connecting piece, and a bending portion connected between the connecting portion for main body and the extending portion; the extending portion extends along the thickness direction of the secondary battery, and the bending portion is bent with respect to the extending portion.

Optionally, the main body has a first side and a second side, the tab is provided at the first side, none of the tab is provided at the second side, and the bending portion and the connecting portion for main body are located at the first side.

Optionally, the main body includes a winding-starting layer, which is a starting end of an innermost layer of the main body, and the tab extends from a side of the winding-starting layer viewed in the thickness direction of the secondary battery.

Optionally, the at least one electrode assembly includes two electrode assemblies arranged side by side in the thickness direction of the secondary battery, and the second sides of the two main bodies of the two electrode assemblies are adjacent to each other.

Optionally, the secondary battery further includes a supporting piece disposed between the main body and the extending portion.

Optionally, the supporting piece has a bar-like structure, and the tab bypasses the supporting piece.

Optionally, at least a part of the supporting piece is attached to the main body.

Optionally, the supporting piece includes a first portion and a second portion, and the first portion is disposed opposite to the electrode terminal. On a surface of the supporting piece facing toward the top cover plate, an edge of the first portion protrudes with respect to the second portion. The first portion is attached to the main body, and the tab bypasses the second portion.

Optionally, the supporting piece includes a first portion and a second portion. The first portion is disposed opposite to the electrode terminal, and the tab bypasses the second portion. The second portion protrudes with respect to the first portion at a side of the supporting piece viewed in the thickness direction of the secondary battery.

Optionally, the supporting piece includes a supporting portion and a guiding portion, and the guiding portion is connected to an end of the supporting portion and bent with respect to the supporting portion. The supporting portion is attached to the extending portion, and the guiding portion is attached to the bending portion.

Optionally, each of the two guiding portions includes a middle section connected to the supporting portion and an inclination section connected to the middle section, the inclination section of the guiding portion is inclined with respect to the middle section, and the inclination section is attached to the connecting portion for main body.

Optionally, each portion of the supporting piece has a minimum thickness of 0.1 mm-5 mm, and the supporting piece has a Young's elastic modulus of 1000 MPa-10000 MPa.

Optionally, a ratio of a width of the conductive portion to a thickness of the conductive portion is in a range of 100-5000.

A second aspect of the present disclosure provides a vehicle including the secondary battery described above.

The technical solutions provided by the present disclosure can achieve the following beneficial effects.

In the secondary battery provided by the present disclosure, the tab is bent with respect to the height direction and connected to the connecting piece, so that space utilization can be increased and thus the energy density of the secondary battery is increased. Meanwhile, the tabs are provided at only one side of the main body of the electrode assembly. In this way, at a same thickness of the stacked main bodies, the thickness of the tabs is significantly decreased, so that end misalignment of the innermost conductive portion and the outermost conductive portion is alleviated when being bent. Therefore, the outermost conductive portion can be easily connected to the connecting piece, the redundancy of the innermost conductive portion is significantly reduced, thereby reducing the risk of short-circuit of the secondary battery caused by a redundant and overlong conductive portion inserting into the main body when being pressed. Therefore, when assembling the secondary battery, the electrode assembly can be easily connected to the connecting piece, and the safety of the secondary battery can be improved.

It should be understood that the above general description and the following detailed description are exemplary only, and do not limit the present disclosure.

REFERENCE SIGNS

100—top cover plate;
110—explosion-proof hole;
120—injection hole;
200—case;
300—first electrode terminal;
400—second electrode terminal;
500—first connecting piece;
510—electrode terminal connecting portion;
520—tab connecting portion;
530—transition connecting portion;
600—second connecting piece;
640—fusing portion;
700—electrode assembly;
710—main body;
711—first electrode plate;
712—second electrode plate;
713—separator;
720—first tab;
721—connecting portion for main body;
722—bending portion;
723—extending portion;
730—second tab;
740—winding-starting layer;
800—supporting piece;
810—first portion;
811—first edge;
812—second edge;
813—recessed region;
814—protection structure accommodation region;
820—third portion;
821—vent hole;
830—second portion;
840—through hole;
860—notch;
870—supporting portion;
880—guiding portion;
881—middle section;
882—inclination section;
900—protection structure.

The accompanying drawings, which are incorporated in and constitute a part of this specification, illustrate embodiments according to the present disclosure and together with the specification serve to explain the principles of the present disclosure.

DESCRIPTION OF EMBODIMENTS

The present disclosure will be further described in detail as follows through embodiments and with reference to accompanying drawings. Based on a placement manner of a battery as shown in FIG. 1, a height direction of the secondary battery is referred to as a height direction Z, a length direction of the secondary battery is referred to as a length direction X, and a thickness direction of the secondary battery is referred to as a thickness direction Y.

Figure 16:
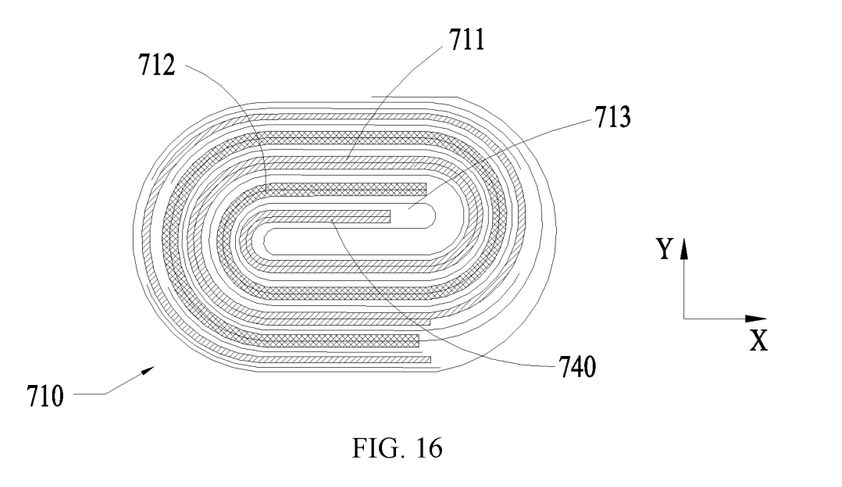
FIG. 16 is a structural schematic diagram of an electrode assembly in a secondary battery according to an embodiment of the present disclosure.

As shown in FIGS. 1-16, embodiments of the present disclosure provide a secondary battery, including a top cover plate 100, electrode terminal (such as a first electrode terminal 300 and a second electrode terminal 400), an electrode assembly 700, and connecting pieces (such as a first connecting piece 500 and a second connecting piece 600). The first electrode terminal 300 or the second electrode terminal 400 is placed at the top cover plate 100. The electrode assembly 700 includes a main body 710 and a plurality of conductive portions (such as first conductive portions and second conductive portions) extending from the main body 710, and the plurality of conductive portions is stacked and forms tab, for example, the plurality of first conductive portions is stacked and forms a first tab 720, or the plurality of second conductive portions is stacked and forms a second tab 730. As shown in FIG. 16, the main body 710 is formed by winding a first electrode plate 711, a second electrode plate 712, and a separator 713 disposed between the first electrode plate 711 and the second electrode plate 712. The connecting piece connects the tab to the electrode terminal, for example, the first connecting piece 500 connects the first tab 720 to the first electrode terminal 300, or the second connecting piece 600 connects the second tab 730 to the second electrode terminal 400. The tab extends from a side of the main body 710 viewed in the thickness direction Y (the thickness direction Y is the thickness direction of the main body 710), and the tab is bent with respect to the height direction Z and is connected to the connecting piece.

In the secondary battery described above, the electrode assembly 700 is provided with tab only at one side of the main body 710. In this way, at a same thickness of the stacked main bodies 710, the thickness of the tab is significantly reduced, so that end misalignment of the innermost conductive portion and the outermost conductive portion is alleviated when being bent. Therefore, the outermost conductive portion can be easily connected to the connecting piece, the redundancy of the innermost conductive portion is significantly reduced, thereby reducing the risk of short-circuit of the secondary battery caused by a redundant and overlong conductive portion inserting into the main body when being pressed. Therefore, when assembling the secondary battery, the electrode assembly 700 can be easily connected to the connecting piece, and the safety of the secondary battery can be improved.

Figure 1:
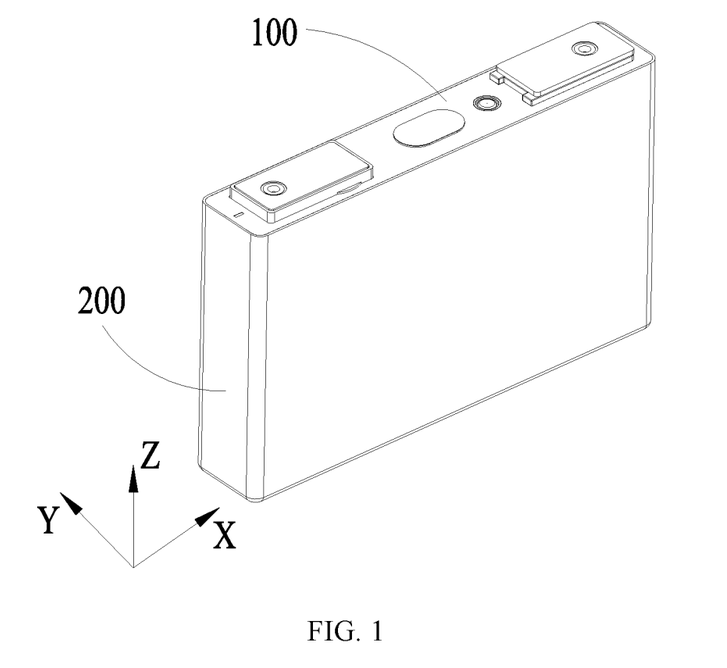
FIG. 1 is a structural schematic diagram of a secondary battery according to an embodiment of the present disclosure.
Figure 2:
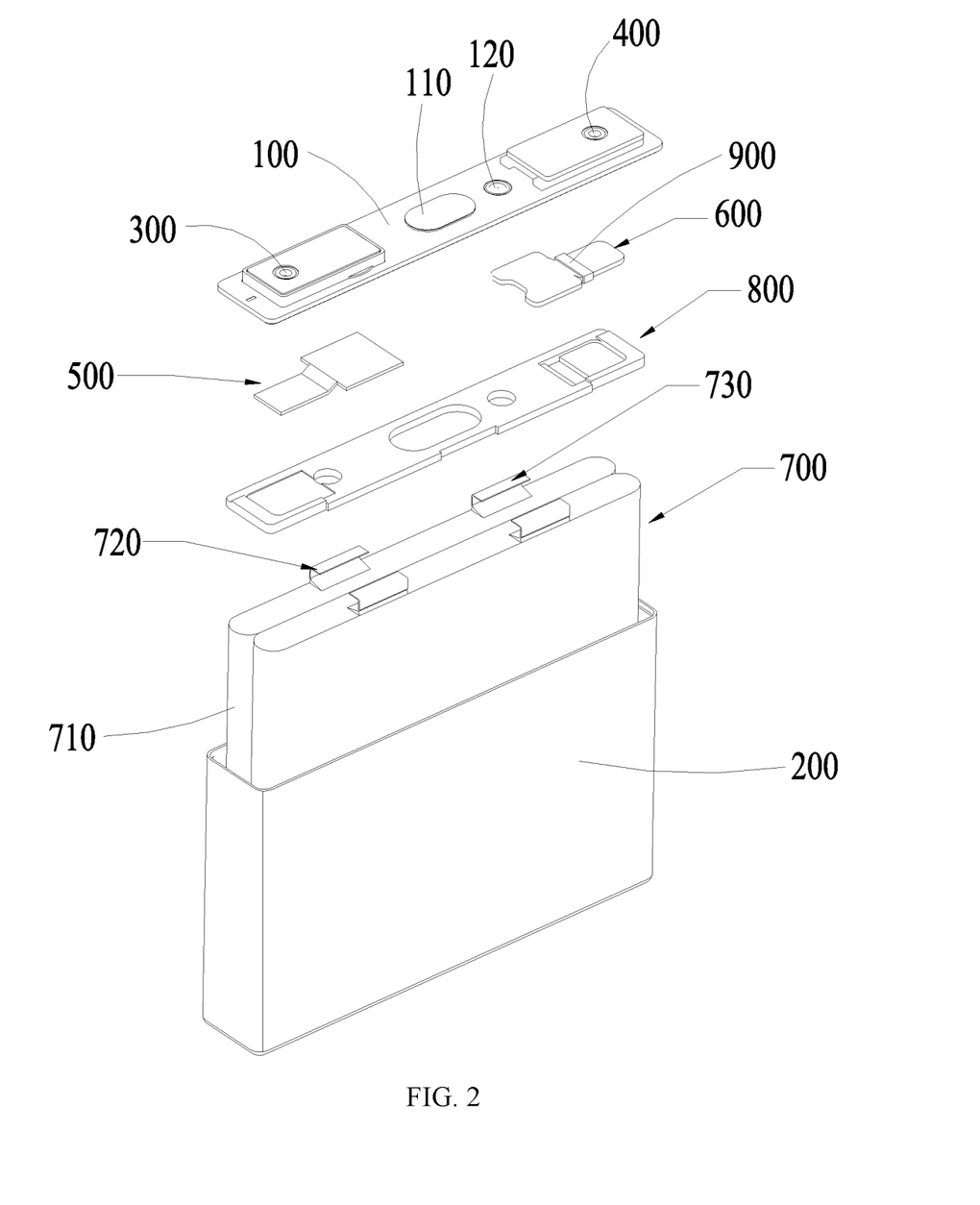
FIG. 2 is an exploded view of a secondary battery according to an embodiment of the present disclosure.
Figure 3:
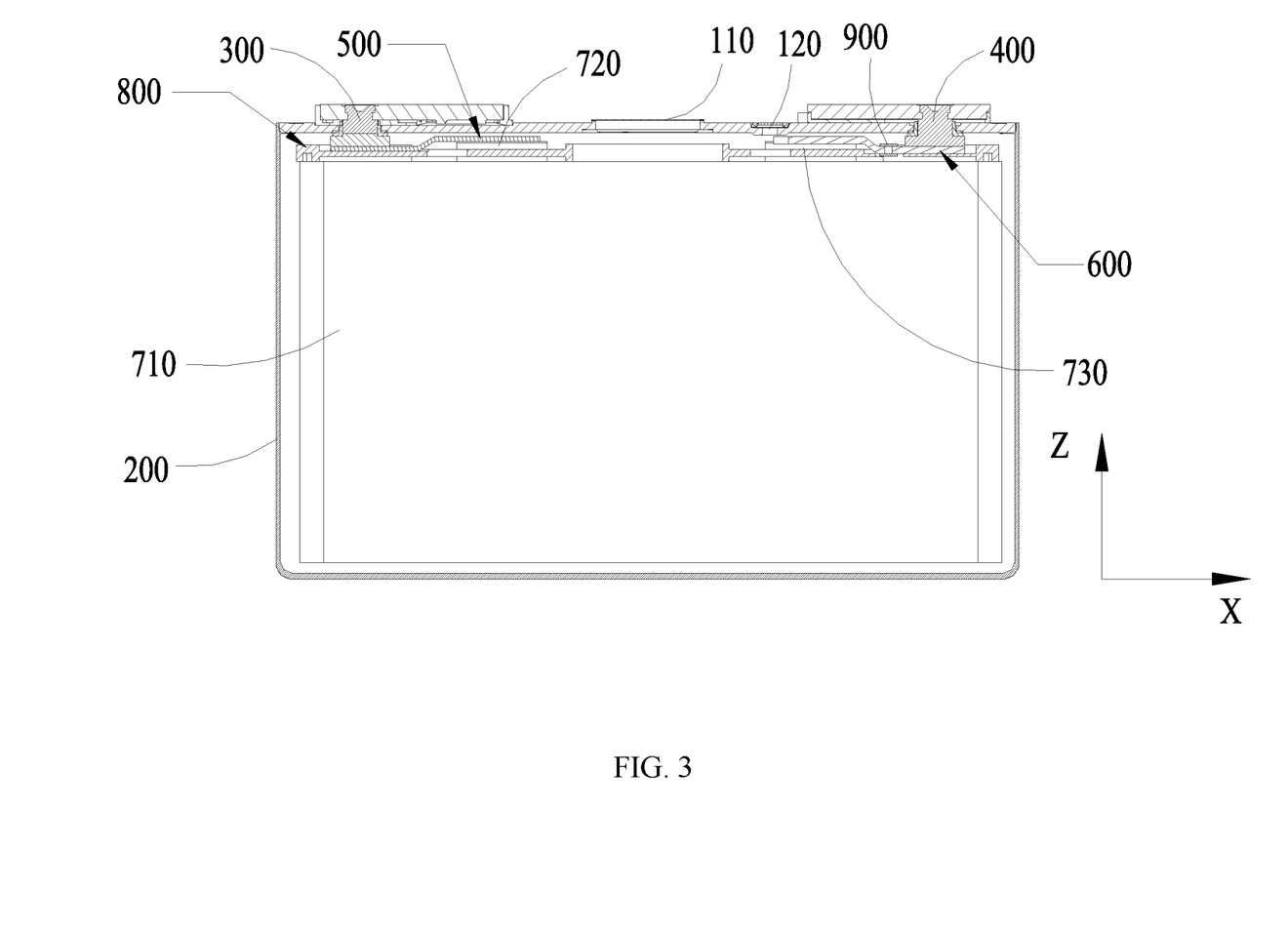
FIG. 3 is a cross-section view of a secondary battery according to an embodiment of the present disclosure.
Figure 4:
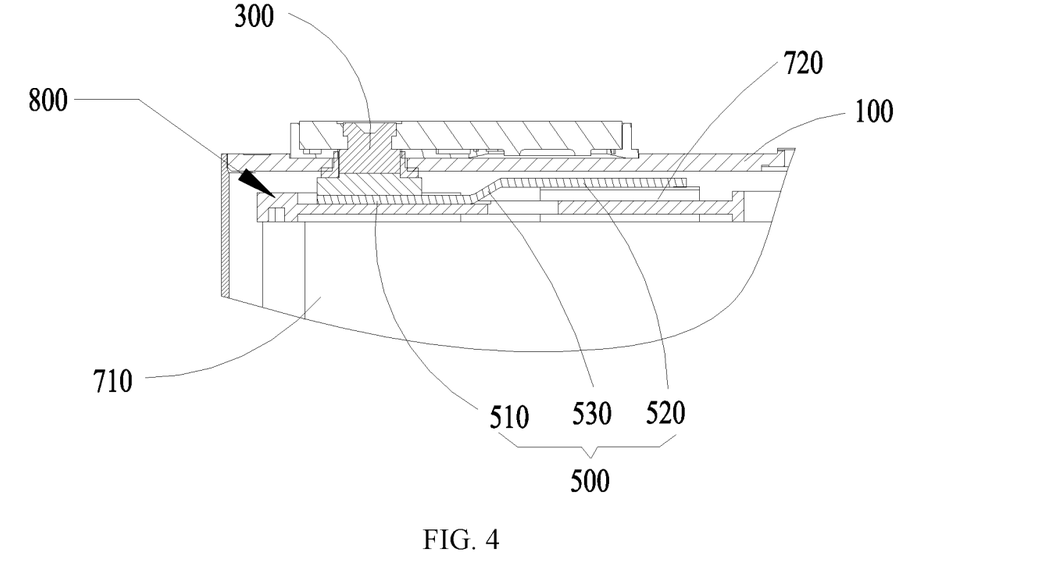
FIG. 4 is a partial view of FIG. 3.

As shown in FIGS. 1-3, the secondary battery further includes a case 200. The top cover plate 100 covers and seals the case 200. The electrode assembly 700 is accommodated in the case 200. As shown in FIG. 2, the top cover plate 100 is provided with an explosion-proof hole 110 and an injection hole 120. The above electrode terminals include a first electrode terminal 300 and a second electrode terminal 400. The first electrode terminal 300 and the second electrode terminal 400 are disposed above the top cover plate 100. The connecting pieces include a first connecting piece 500 and a second connecting piece 600. The tabs include a first tab 720 and a second tab 730. The first conductive portions extend from a side of the first electrode plate 711 viewed in the height direction Z, and the second conductive portions extend from a side of the second electrode plate 712 viewed in the height direction Z. With reference to FIG. 16, the first electrode plate 711, the second electrode plate 712, and the separator 713 are stacked and wound. Specifically, the first conductive portions extending from the first electrode plate 711 are stacked to form the first tab 720, and the second conductive portions extending from second electrode plate 712 are stacked to form the second tab 730. In addition, the first tab 720 and the second tab 730 both extend from one side of the main body 710 viewed in the thickness direction Y (the thickness direction Y is the thickness direction of the main body 710). In an assembled secondary battery, as shown in FIG. 3, the first tab 720 is connected to the first electrode terminal 300 through the first connecting piece 500, and the second tab 730 is connected to the second electrode terminal 400 through the second connecting piece 600.

The main body 710 has a winding-starting layer 740. The winding starting layer 740 is a winding starting portion of the main body 710 located at innermost layer. The tab extends from the winding-starting layer 740 at one side viewed in the thickness direction Y. In this way, conductive portion located at the innermost layer and conductive portion located at the outermost side have a reduced span in the thickness direction Y. When bending the tab, an end of the tab away from the main body 710 is less likely to be misaligned and is more easily connected to the connecting piece. Besides, in this way, the overall extending length of the tab can be decreased, thereby reducing the risk of short-circuit due to the tab being too long. The winding-starting layer 740 may be a winding starting portion of the first electrode plate 711, the first tab 720 is not extended at this position, and both the first tab 720 and the second tab 730 are located at a side of the winding starting layer 740 viewed in the thickness direction Y.

Figure 5:
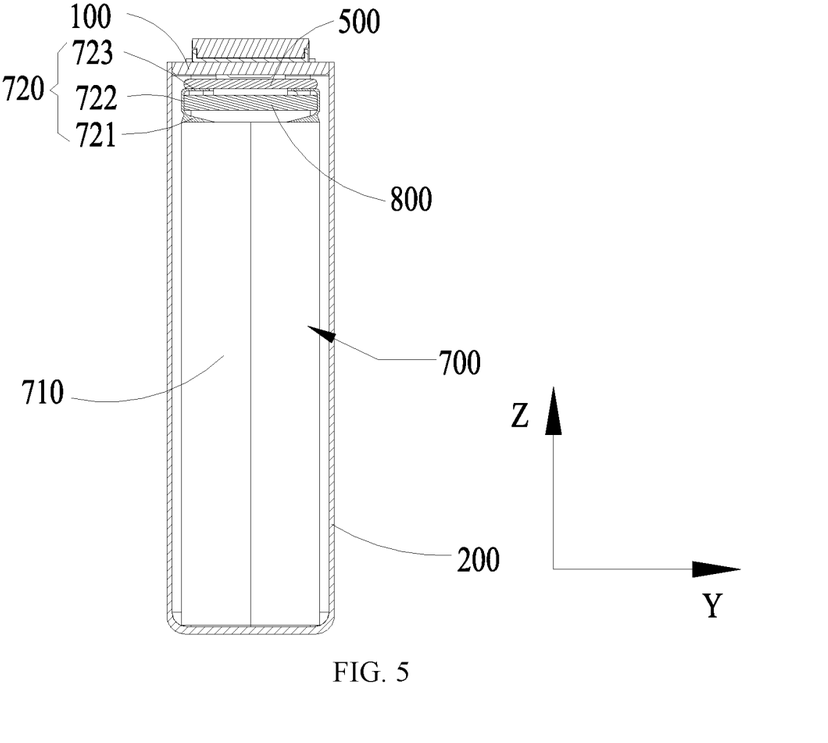
FIG. 5 is another cross-section view of a secondary battery according to an embodiment of the present disclosure.
Figure 6:
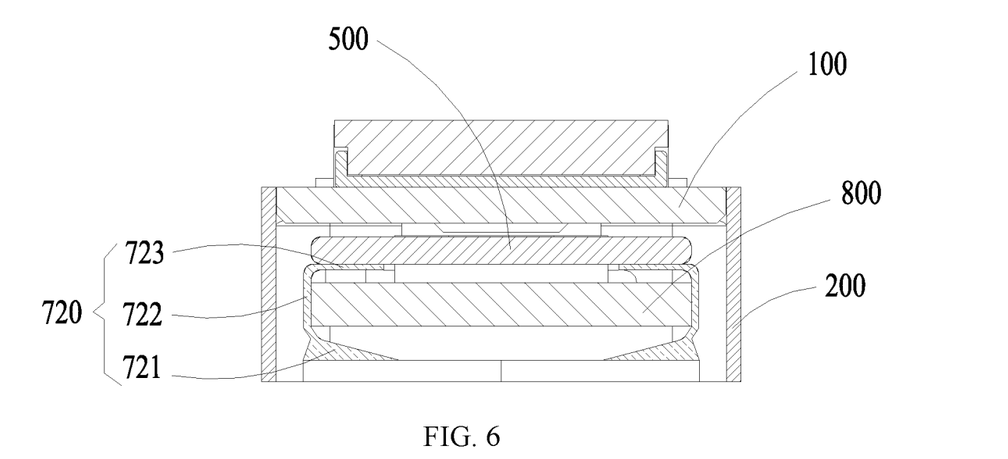
FIG. 6 is a partial view of FIG. 5.

The first tab 720 and the second tab 730 may have a same structure, which will be described in the following by taking the first tab 720 as an example. As shown in FIGS. 5-6, the first tab 720 includes a connecting portion for main body 721 connected to the main body 710, an extending portion 723 connected to the connecting piece, and a bending portion 722 connected between the connecting portion for main body 721 and the extending portion 723. The extending portion 723 extends along the thickness direction Y. The bending portion 722 is bent with respect to the extending portion 723. With this configuration, the first tab 720 is bent as regularly as possible, thereby increasing space utilization inside the secondary battery and increasing energy density of the secondary battery.

The main body 710 has a first side and a second side viewed in the thickness direction Y. The first side is a side where the tabs are located. That is, along the thickness direction Y, taking the winding starting layer 740 as a boundary, a side of the main body 710 from which the first tab 720 and the second tab 730 extend is referred to as the first side, and the other side is referred to as the second side, i.e., the second side is a side not provided with tab. The connecting portion for main body 721 may extend in the thickness direction Y away from the first side, which will increase extending length of the first tab 720. In an embodiment of the present disclosure, the bending portion 722 and the connecting portion for main body 721 are located at a same side, i.e., the connecting portion for main body 721 extends toward a direction away from the second side with respect to the main body 710. That is, the first tab 720 firstly extends toward a side of the main body 710 away from the second side so as to form the connecting portion for main body 721, and then is bent with respect to the connecting portion for main body 721 to form the bending portion 722 and the extending portion 723. This structure decreases the length of the first tab 720 (the length of the first tab 720 refers to dimension of the first tab 720 along its extending direction when being unfolded), thereby reducing the redundancy of the first tab 720 and thus further improving safety of the secondary battery.

It should be understood that stress concentration may occur at bending portion of the tab, and thus for relieving the stress concentration at the bending portion, arc transition is adopted between the connecting portion for main body 721 and the bending portion 722 as well as between the bending portion 722 and the extending portion 723, so as to prevent the tab from being broken due to the bending, thereby improving the reliability of the secondary battery.

Taking current flowing area into account, compared to a solution that two tabs both extend from a same winding layer, stacked thickness of tab in the present disclosure is significantly reduced. In order to guarantee a sufficient current flowing area of the tab, the ratio of a width of the conductive portion to the thickness of the conductive portion is within a range of 100-5000. That is, the tab is set to be wide, so as to increase the current flowing area of the tab. Here, the width of the conductive portion refers to dimension of the conductive portion along the length direction X in an unfolded state, and the thickness of the conductive portion refers to dimension of the conductive portion along the thickness direction Y in an unfolded state.

There can be only one or two electrode assemblies 700 as described above. When two electrode assemblies 700 are provided, the two electrode assemblies 700 are arranged side by side in the thickness direction Y. In an embodiment, the first side of the main body 710 is adjacent to the second side of another main body 710, two connecting portions for main body 721 are stacked, two extending portions 723 are stacked, and therefore the secondary battery needs to provide corresponding space in the height direction Z corresponding a width of two connecting portions for main body 721 and a width of two extending portions 723, which is disadvantageous for improving energy density of the secondary battery. In another embodiment of the present disclosure, as shown in FIG. 2, FIG. 5, and FIG. 6, the second sides of two main bodies 710 are adjacent to each other, so that the two first tabs 720 do not mutually interfere. In addition, the two first tabs 720 are bent around the first connecting piece 500 and extend along two sides viewed in the Y direction, at least the two connecting portions for main body 721 are not stacked on each other. With this configuration, the dimension of the secondary battery in the height direction Z is reduced by the thickness of one connecting portion for main body 721, and thus the dimension of the secondary battery in the height direction Z is reduced, thereby improving energy density of the secondary battery. Preferably, the two extending portions 723 extend toward each other and a space is remained therebetween. The two extending portions 723 may be respectively located at the first side of the respective main bodies 710. In this way, the two extending portions 723 are not stacked, which may further reduce the dimension of the secondary battery in the height direction Z.

Figure 7:
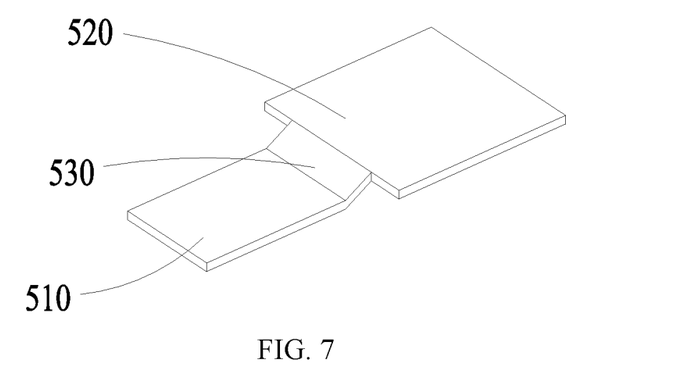
FIG. 7 is a structural schematic diagram of a connecting piece in a secondary battery according to an embodiment of the present disclosure.

The first connecting piece 500 and the second connecting piece 600 may have a same structure, and it will be described in the following by taking the first connecting piece 500 as an example. As shown in FIG. 7, the first connecting piece 500 includes an electrode terminal connecting portion 510 and a tab connecting portion 520. The tab connecting portion 520 is disposed on a higher plane than a plane where the electrode terminal connecting portion 510 is located, so as to form electrode terminal accommodation space above the electrode terminal connecting portion 510 for accommodating the first electrode terminal 300, as well as form tab accommodation space under the tab connecting portion 520 for accommodating the first tab 720. In this way, the connecting portion for main body 721 is disposed in the tab accommodation space, and the first electrode terminal 300 is disposed in the electrode terminal accommodation space, thereby fully utilizing the thickness of the first connecting piece 500 (the thickness of the first connecting piece 500 refers to the dimension of the first connecting piece 500 in the height direction Z). In the height direction Z of the secondary battery, the first electrode terminal 300 and the first tab 720 can share the space along the thickness of the first connecting piece 500, so that the dimension of the secondary battery in the height direction Z is reduced, thereby increasing the energy density of the secondary battery. In addition, the first tab 720 is connected to a lower surface of the tab connecting portion 520, which can increase contact area between the first tab 720 and the first connecting piece 500 and further increases the reliability of the connection therebetween. Meanwhile, compared with the connection manner in which the first tab 720 is connected to a lateral surface of the first connecting piece 500, with this connection manner, the sufficient contact area between the first tab 720 and the first connecting piece 500 can be guaranteed by bending the first tab 720, and the dimension of the first tab 720 in the height direction of the secondary battery also can be reduced, thereby further increasing the energy density of the secondary battery. In addition, by connecting the first tab 720 to the lower surface of the tab connecting portion 520, the end of the first tab 720 can be covered by the first connecting piece 500, so that the first tab 720 is protected from being in direct contact with other components such as the top cover plate 100 through burr at an end of the first tab 720, thus improving the safety of the secondary battery.

The first connecting piece 500 further includes a transition connecting portion 530 that connects the electrode terminal connecting portion 510 with the tab connecting portion 520, and the transition connecting portion 530 tilts up with respect to the electrode terminal connecting portion 510 so as to increase rigidity of the first connecting piece 500.

Figure 8:
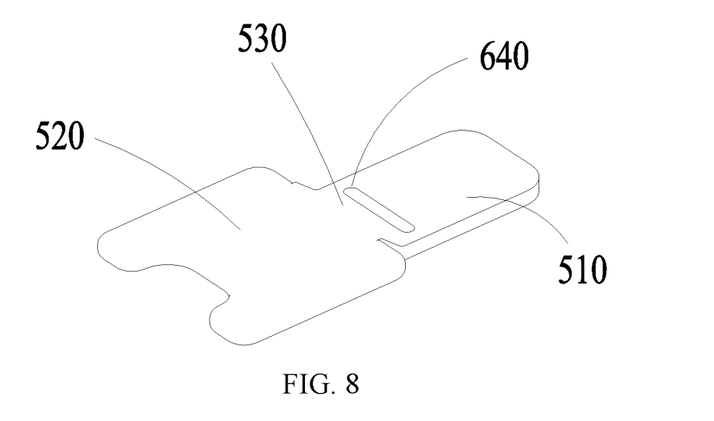
FIG. 8 is a structural schematic diagram of a connecting piece in a secondary battery according to another embodiment of the present disclosure.

In addition, when the secondary battery is overcharged and forms short-circuit, in order to quickly disconnect electrical connection between the electrode terminal and the electrode assembly 700, a fusing portion 640 may be provided on the connecting piece. As shown in FIG. 8, the fusing portion 640 is provided on the second connecting piece 600. When the short-circuit occurs in the secondary battery, the second connecting piece 600 is disconnected at the position of the fusing portion 640, so that the electrode terminal connecting portion 510 is disconnected with the tab connecting portion 520, and thus the second electrode terminal 400 is disconnected with the second tab 730. Here, the fusing portion 640 may be formed by a through-hole in the transition connecting portion 530, so that the fusing portion 640 has a smaller current flowing area than other region on the second connecting piece 600.

When the fusing portion 640 is provided on the connecting piece, the secondary battery further includes a protection structure 900, as shown in FIG. 2. The protection structure 900 may be made of plastic material and wraps the fusing portion 640. When the fusing portion 640 is fused, the fusing portion 640 will not fall down because of the protection structure 900, thereby preventing the fusing portion 640 from dropping into the electrode assembly 700 and thus causing a short-circuit between the first electrode plate 711 and the second electrode plate 712. In this way, the safety of the secondary battery can be improved.

After the first tab 720 is connected to the first connecting piece 500, the first connecting piece 500 will be bent toward the main body 710 due the gravity, which may cause the first tab 720 to contact with the first electrode plate 711 and the second electrode plate 712 of the main body 710, further resulting in the short-circuit in the electrode assembly 700. Especially, when vibration and impact occur during the application of the secondary battery, it may cause serious accidents. In order to solve the above problem, the secondary battery of the present disclosure further includes a supporting piece 800 disposed between the main body 710 and the extending portion 723. By providing the supporting piece 800, even the first tab 720 has a tendency to bend toward the main body 710 due to gravity, the first tab 720 can be supported by the supporting piece 800. Besides, the supporting piece 800 separates the first tab 720 from the main body 710, so that the risk of the extending portion 723 being in contact with the first electrode plate 711 and the second electrode plate 712 can be further decreased. In addition, when the first tab 720 is pressed, since the supporting piece 800 separates the first tab 720 from the main body 710, the end of the first tab 720 is difficult to pierce the main body 710, which can also reduce the risk of the short-circuit in the electrode assembly 700. Meanwhile, the first tab 720 is bent around the supporting piece 800, which plays a role of shaping the first tab 720, thereby simplifying the connecting of the first tab 720 with the first connecting piece 500.

Figure 9:
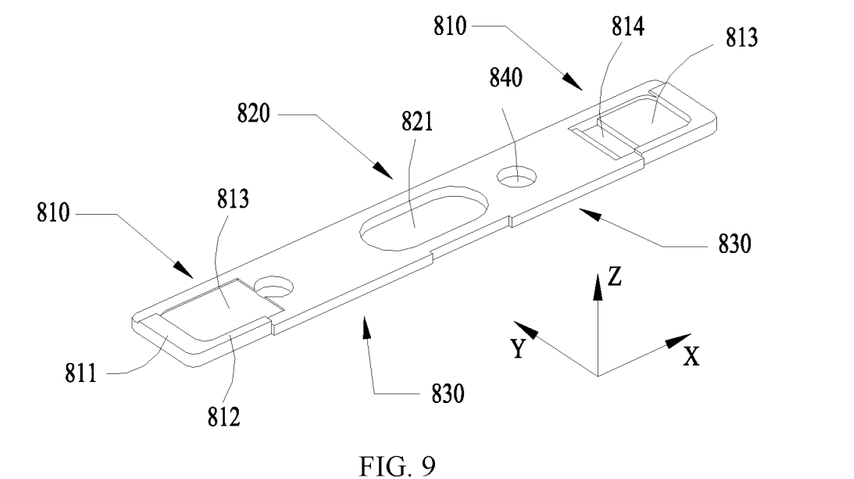
FIG. 9 is a structural schematic diagram of a supporting piece in a secondary battery according to an embodiment of the present disclosure.
Figure 10:
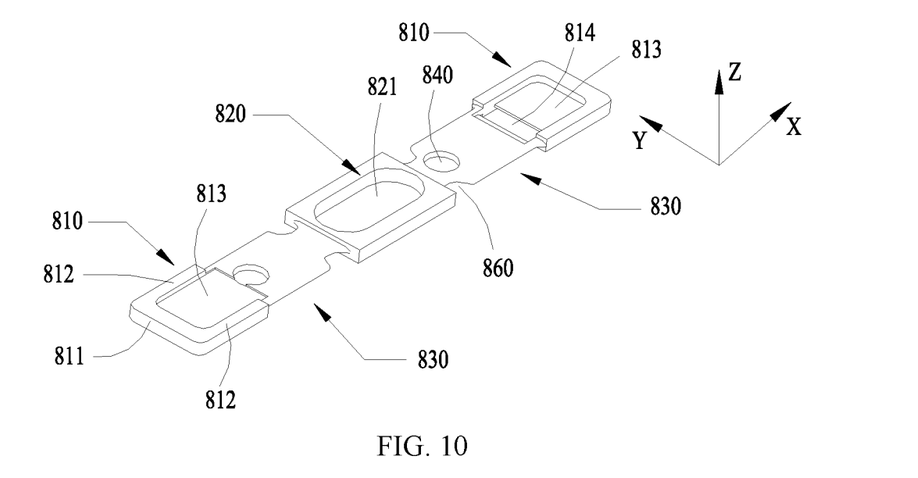
FIG. 10 is a structural schematic diagram of a supporting piece in a secondary battery according to another embodiment of the present disclosure.
Figure 11:
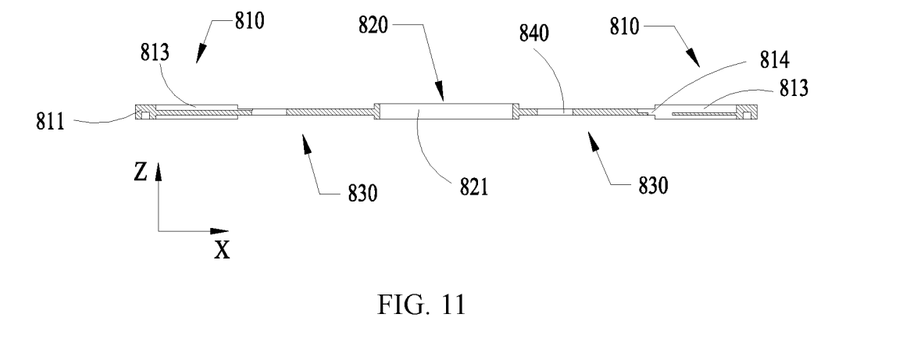
FIG. 11 is a cross-section view of a supporting piece in a secondary battery according to another embodiment of the present disclosure.
Figure 12:
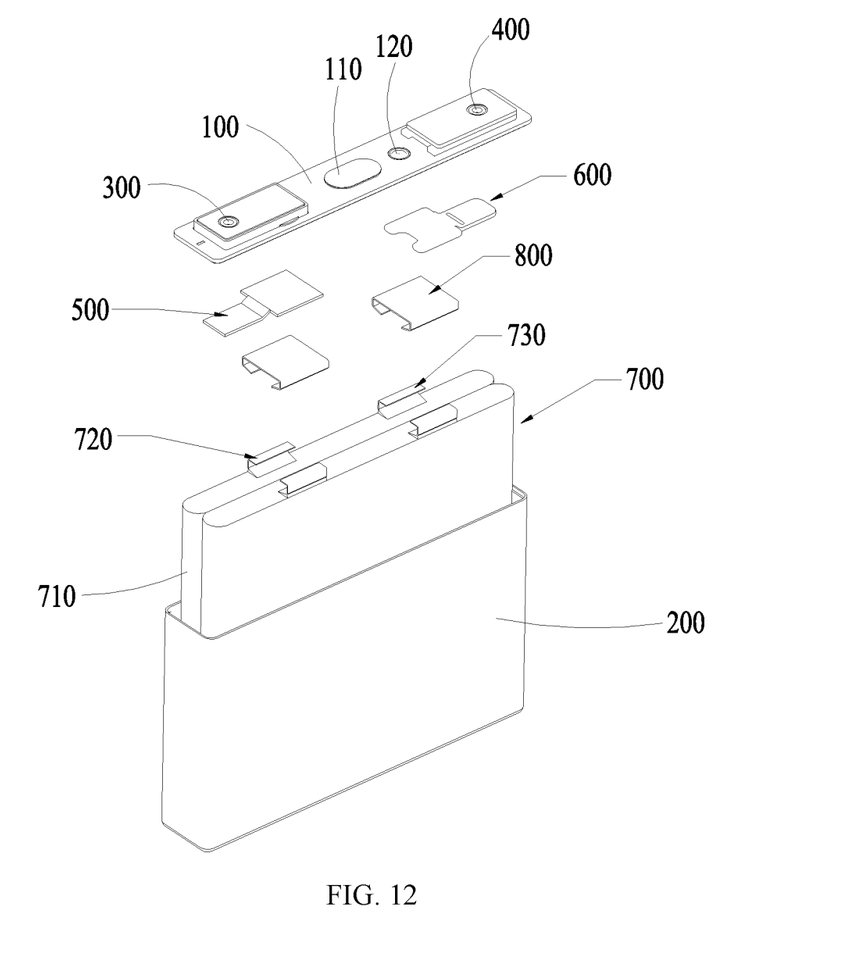
FIG. 12 is an exploded view of a secondary battery according to another embodiment of the present disclosure.
Figure 13:
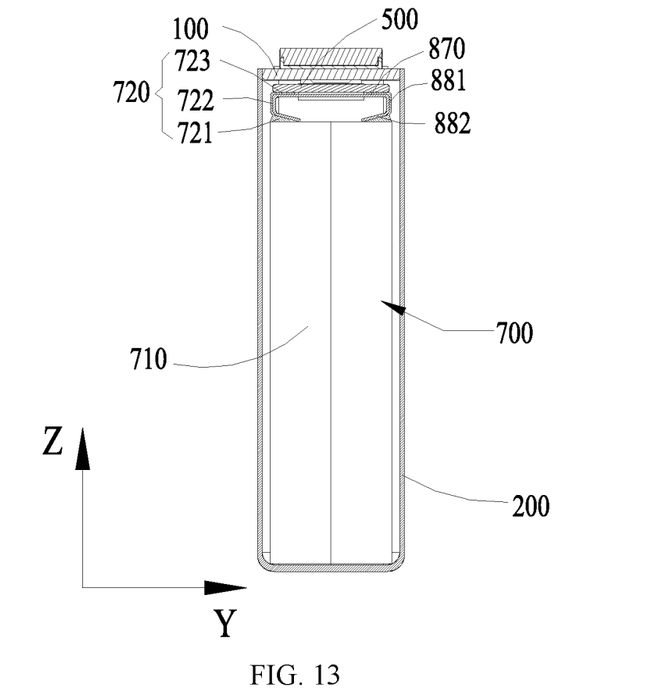
FIG. 13 is a cross-section view of a secondary battery according to another embodiment of the present disclosure.
Figure 14:
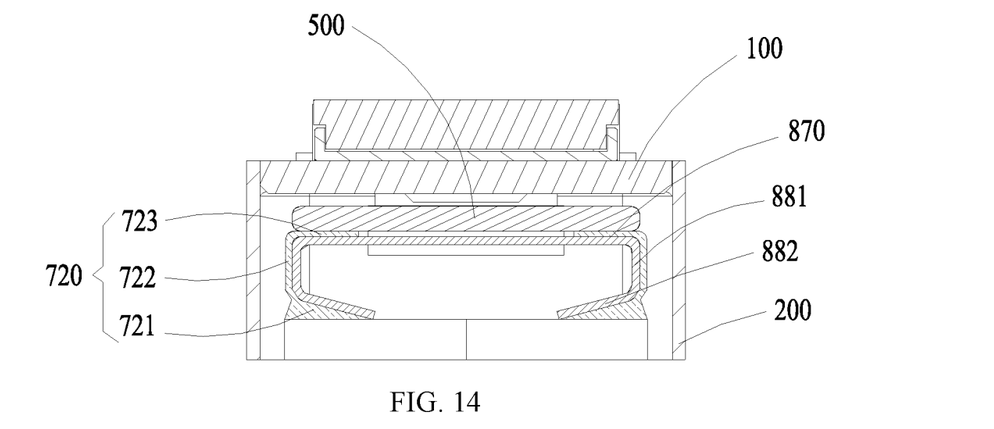
FIG. 14 is a partial view of FIG. 13.
Figure 15:
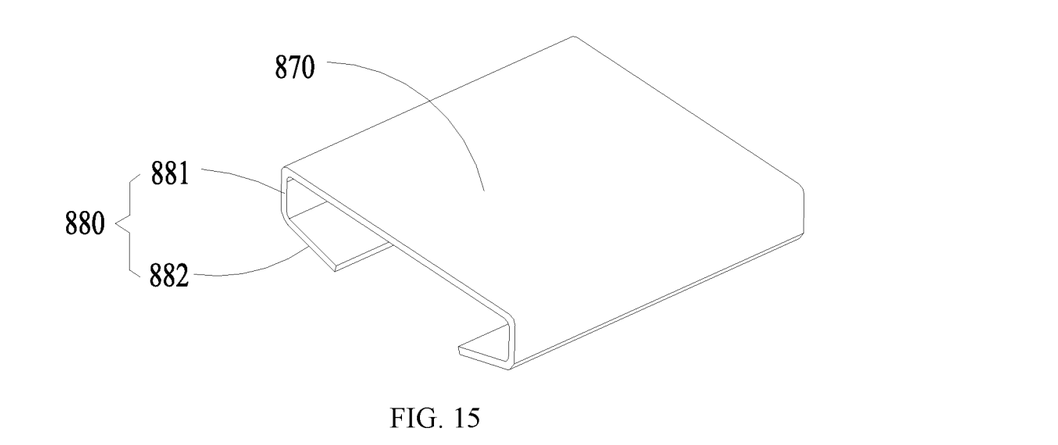
FIG. 15 is a structural schematic diagram of a supporting piece in a secondary battery according to still another embodiment of the present disclosure.

With reference to FIGS. 9-11, the supporting piece 800 may be formed as a bar-shaped structure. The tab bypasses the supporting piece 800, as shown in FIG. 3, the first connection piece 500 and the second connecting piece 600 are respectively located at both ends of the supporting piece 800. The first tab 720 and the second tab 730 respectively bypass the supporting piece 800 from a surface of the supporting piece 800 facing toward the main body 710 to another surface of the supporting piece 800 facing away from the main body 710, so that two extending portions 723 are located between the first connecting piece 500 and the supporting piece 800 and between the second connecting piece 600 and the supporting piece 800, respectively. The supporting piece 800 with such structure divides interior of the secondary battery into two spaces, i.e., upper space and lower pace, which can prevent the components in the upper space from contacting with the main body 710, thereby further improving the safety of the secondary battery. In addition, this structure can improve overall strength of the supporting piece 800, and assembling processes of the secondary battery can be simplified, since only one component needs to be assembled.

When assembling the top cover plate 100 and the case 200, if the tab is subjected to a downward force, the connecting portion for main body 721 of the tab may be inserted into the interior of the main body 710, causing the short-circuit between the first electrode plate 711 and the second electrode plate 712. In order to solve this problem, in an embodiment of the present disclosure, the supporting piece 800 is at least partially attached to the main body 710. With such structure, when the connecting portion for main body 721 is pressed, the force applied on the tab is reduced owning to supporting effect of the supporting piece 800, which can prevent the tab from being inserted into the main body 710 of the electrode assembly 700, thereby avoiding the short-circuit, and thus improving the safety of the secondary battery.

Specifically, the supporting piece 800 includes a first portion 810, a second portion 830, and a third portion 820 that are sequentially connected in length direction. The first portion 810 is opposite to the electrode terminal. When the electrode terminal connecting portion 510 is provided, the electrode terminal connecting portion 510 is opposite to the first portion 810. The tab bypasses the second portion 830. The third portion 820 is provided with a vent hole 821 which is opposite to the explosion-proof hole 110 of the secondary battery. It should be understood that two first portions 810 and two second portions 830 are provided. That is, each end of the third portion 820 along the length direction X is provided with a first portion 810 and a second portion 830, so that the first tab 720 and the second tab 730 can bypass the two second portions 830, respectively. The first electrode terminal 300 and the second electrode terminal 400 are disposed above the two first portions 810, respectively.

In an embodiment, as shown in FIGS. 9-11, on a surface of the supporting piece 800 facing toward the top cover plate 100, edge of the first portion 810 protrudes from the second portion 830 to form a recessed region 813 in central area of the first portion 810. The electrode terminal connecting portion 510 is accommodated in the recessed region 813. In this way, the dimension of the supporting piece 800 in the height direction Z can be fully utilized by disposing the electrode terminal connecting portion 510 in the first portion 810. Besides, since the edge of the first portion 810 has a greater thickness than a thickness of the second portion 830 (this thicknesses refers to a dimension in the height direction Z), the stiffness of the supporting piece 800 can be increased, thereby preventing the supporting piece 800 being bent due to its large length. In addition, the tab accommodation space is formed between the second portion 830 and the connecting piece, and the extending portion 723 of the tab can also fully utilize the thickness of the supporting piece 800 to reduce the dimensions of the tab and supporting piece 800 in the height direction Z, thereby improving the energy density of the secondary battery.

Further, the bottom surface of the recessed region 813 is recessed toward the main body 710 with respect to a surface of the second portion 830 facing toward the top cover plate 100. That is, the bottom surface of the recessed region 813 is closer to the main body 710 than the surface of the second portion 830 facing toward the top cover plate 100. Thus, there is a larger space in the supporting piece 800 for accommodating the connecting piece, and further improve the energy density of the secondary battery.

For further increasing the stiffness of the supporting piece 800, as shown in FIGS. 10-11, on a surface of the supporting piece 800 facing toward the main body 710, the edge of the first portion 810 protrudes with respect to the second portion 830. The first portion 810 is attached to the main body 710.

Here, the edge of the first portion 810 includes a first edge 811 and a second edge 812 that are connected to each other. The first edge 811 is disposed along the thickness direction Y, and the second edge 812 is disposed along the length direction X. The first edge 811 and the second edge 812 protrude with respect to the second portion 830. It should be noted that, there are one second edge 812 (as shown in FIG. 9) or two second edge 812 (as shown in FIG. 10).

In an embodiment, as shown in FIGS. 10-11, on both surfaces of supporting piece 800 (i.e., a surface facing toward the top cover plate 100 and the other surface facing toward the main body 710), the third portion 820 protrudes with respect to the second portion 830 in the height direction Z, so as to further improve the stiffness of the supporting piece 800. In this embodiment, since the second portion 830 is thin and the third portion 820 is thick, tearing is likely to occur at a junction between the second portion 830 and the third portion 820. In order to solve this problem, a notch 860 is provided at the junction between the second portion 830 and the third portion 820 in the present disclosure. The notch 860 may be provided on both sides of the third portion 820 viewed in the length direction X and on both sides of the third portion 820 viewed in the thickness direction Y. Here, the notch 860 may be an arc-shaped notch, so as to better alleviate stress concentration at the junction between the second portion 830 and the third portion 820, thereby preventing breakage at this junction.

The surface of the supporting piece 800 facing toward the main body 710 may be a flat surface, so as to increase a contact area between the supporting piece 800 and the main body 710, balancing pressure of the supporting piece 800 on the main body 710, thereby preventing edges of the first electrode plate 711 and the second electrode plate 712 from being bent due to the excessively concentrated pressure on the main body 710.

In an embodiment, as shown in FIG. 9, the second portion 830 protrudes with respect to the first portion 810 at a side of the supporting piece 800 viewed in the thickness direction Y. With this structure, when the tab has a large length, the tab bypasses the supporting piece 800 at the side where the second portion 830 protrudes with respect to the first portion 810 in the thickness direction Y, so as to increase bending length of the tab. In this way, the tab is prevented from contacting with the first electrode plate 711 or the second electrode plate 712 due to the redundancy of the tab and thus the short-circuit can be avoided, thereby improving the safety of the secondary battery. When the tab has a small length, the tab bypasses the second portion 830 at the other side in the thickness direction Y, so as to reduce bending length of the tab, ensuring a connection between the tab and the connecting piece.

It should be noted that when the connecting piece (such as a first connecting piece 500 or a second connecting piece 600) is provided with a fusing portion 640, the supporting piece 800 is further provided with a protection structure accommodation region 814. The protection structure accommodation region 814 may be a groove or a through hole. The protection structure accommodation region 814 may be disposed in the recessed region 813 to further reduce dimensions of the connecting piece and supporting piece 800 in the height direction Z, thereby increasing the energy density of the secondary battery.

It should be understood that when the supporting piece 800 is formed as a bar-shaped structure, the supporting piece 800 is further provided with a through hole 840 is aligned with the injection hole 120 of the top cover plate 100 for injecting liquid into the interior of the secondary battery.

In another embodiment, two supporting pieces 800 are provided. That is, the first tab 720 and the second tab 730 bypass two supporting pieces 800, respectively. With this structure, when the two supporting pieces 800 and the two tabs are under pressure, they will not affect each other, which can prevent the tab at one end from being pulled by the deformed supporting piece 800 at the other end, thereby improving the safety of the secondary battery.

It will be described in the following by taking one supporting piece 800 as an example. As shown in FIGS. 12-15, the supporting piece 800 further includes a supporting portion 870 and two guiding portions 880 connected to both ends of the supporting portion 870 and bent with respect to the supporting portion 870. The supporting portion 870 is attached to the extending portion 723, and the guiding portion 880 is attached to the bending portion 722. The tab extends along the guiding portion 880 to the supporting portion 870 so that the bending of the tab is more controllable, improving the shaping effect of the supporting piece 800 on the tab. When the top cover plate 100 and the case 200 are assembled, the tab and the supporting piece 800 are pressed, the ends of the two guiding portions 880 are getting close to each other, thereby reducing the pressure and supporting the tab, and thus preventing the tab from inserting into the main body 710 of the electrode assembly 700 and forming short-circuit, thereby improving the safety of the secondary battery. Meanwhile, during the pressing process, the tab is expanded in the thickness direction Y along with the deformation of the guiding portion 880, thereby preventing the tab from being stacked in the height direction Z. In this way, short-circuit of the electrode assembly 700 can be avoided by preventing the tab from piercing the separator 713 under the pressure, thereby improving the safety of the secondary battery.

The guiding portion 880 may include an inclination section 882. When the tab extends from the inclination section 882 to the supporting portion 870, since bending angle of the inclination section 882 and the supporting portion 870 is too large, the tab may form a sharp angle at this position, which is likely to result in a breakage of the tab. In an embodiment of the present disclosure, each guiding portion 880 includes a middle section 881 connected to the supporting portion 870 and an inclination section 882 connected to the middle sections 881. The two inclination sections 882 of the two guiding portion 880 are inclined with respect to the middle section 881. The inclination section 882 is attached to the connecting portion for main body 721. The inclination section 882 and the supporting portion 870 are located at a same side of the middle section 881. A deformation space is arranged between the respective ends of the two guiding portions 880. That is, the supporting piece 800 is substantially formed as a C-shaped structure. With this structure, by providing the middle section 881, the tab extends to the supporting portion 870 along with the inclination section 882 and the middle section 881 so as to be bent twice. In this way, the tab is relatively slightly bent each time, thereby preventing the tab from being broken at the bending position and thus improving the safety of the secondary battery.

In a preferred embodiment, each portion of supporting piece 800 has a minimum thickness of 0.1 mm-5 mm, i.e., minimum dimension of each section of supporting piece 800 in the height direction Z is within a range of 0.1 mm-5 mm, such as 0.1 mm, 0.15 mm, 0.5 mm, 1 mm, 2.5 mm, 3.5 mm, 4.5 mm, 4.9 mm, 5 mm, etc. The supporting piece 800 has a Young's elastic modulus of 1000 MPa-10000 MPa, such as 1000 MPa, 3000 MPa, 5000 MPa, 8000 MPa, 9000 MPa, 10000 MPa. With the abovementioned configuration, the elastic deformation capability of the supporting piece 800 can be guaranteed, so as to improve guiding effect of the supporting piece 800 on the tab.

It should be noted that, when the supporting piece 800 has the above-mentioned bar-shaped structure (i.e., only one supporting battery 800 is provided in the secondary battery for supporting the first tab 720 and the second tab 730), the supporting piece 800 may also include the supporting portion 870 and the guiding portion 880. In this case, each of two ends of the supporting piece 800 in the length direction X is provided with the supporting portion 870 and the guiding portion 880.

The supporting piece 800 is made of an insulation material, such as plastic material, and the connecting piece is made of metal material, such as nickel plate.

It is possible that the first electrode plate 711 is a positive electrode plate, and the second electrode plate 712 is a negative electrode plate, and correspondingly, the first electrode terminal 300 is a positive electrode terminal, and the second electrode terminal 400 is a negative electrode terminal. It is also possible that the first electrode plate 711 is a negative electrode plate, and the second electrode plate 712 is a positive electrode plate, and correspondingly, the first electrode terminal 300 is a negative electrode terminal, and the second electrode terminal 400 is a positive electrode terminal.

In addition, the present disclosure further provides a vehicle including the secondary battery described in any one of the above embodiments.

The above-described embodiments are merely preferred embodiments of the present disclosure and are not intended to limit the present disclosure. Those skilled in the art may make various modifications and changes. Any modifications, equivalent substitutions and improvements made within the principle of the present disclosure shall fall into the protection scope of the present disclosure.

What is claimed is:

1. A secondary battery, comprising:
a top cover plate;
an electrode terminal disposed on the top cover plate;
at least one electrode assembly, wherein each of the at least one electrode assembly comprises a main body and a plurality of conductive portions extending from the main body, the plurality of conductive portions is stacked and forms a tab, and the main body is formed by winding a first electrode plate, a second electrode plate, and a separator disposed between the first electrode plate and the second electrode plate; and
a connecting piece for connecting the tab to the electrode terminal,
wherein the tab extends from a side of the main body viewed in a thickness direction of the secondary battery, and the tab is bent with respect to a height direction of the secondary battery and connected to the connecting piece.

2. The secondary battery according to claim 1, wherein the main body comprises a winding-starting layer, which is a starting end of an innermost layer of the main body, and the tab extends from a side of the winding-starting layer viewed in the thickness direction of the secondary battery.

3. The secondary battery according to claim 1, wherein the tab comprises a connecting portion for main body connected to the main body, an extending portion connected to the connecting piece, and a bending portion connected between the connecting portion for main body and the extending portion, and
wherein the extending portion extends along the thickness direction of the secondary battery, and the bending portion is bent with respect to the extending portion.

4. The secondary battery according to claim 3, wherein the main body has a first side and a second side, the tab is provided at the first side, none of the tab is provided at the second side, and the bending portion and the connecting portion for main body are located at the first side.

5. The secondary battery according to claim 4, wherein the at least one electrode assembly comprises two electrode assemblies arranged side by side in the thickness direction of the secondary battery, and the second sides of the two main bodies of the two electrode assemblies are adjacent to each other.

6. The secondary battery according to claim 5, wherein the secondary battery further comprises a supporting piece disposed between the main body and the extending portion.

7. The secondary battery according to claim 6, wherein the supporting piece has a bar-like structure, and the tab bypasses the supporting piece.

8. The secondary battery according to claim 7, wherein at least a part of the supporting piece is attached to the main body.

9. The secondary battery according to claim 8, wherein the supporting piece comprises a first portion and a second portion, and the first portion is disposed opposite to the electrode terminal;
wherein on a surface of the supporting piece facing toward the top cover plate, an edge of the first portion protrudes with respect to the second portion; and
wherein the first portion is attached to the main body, and the tab bypasses the second portion.

10. The secondary battery according to claim 7, wherein the supporting piece comprises a first portion and a second portion, the first portion is disposed opposite to the electrode terminal, and the tab bypasses the second portion, and
wherein the second portion protrudes with respect to the first portion at a side of the supporting piece viewed in the thickness direction of the secondary battery.

11. The secondary battery according to claim 6, wherein the supporting piece comprises a supporting portion and a guiding portion, and the guiding portion is connected to an end of the supporting portion and bent with respect to the supporting portion; and
wherein the supporting portion is attached to the extending portion, and the guiding portion is attached to the bending portion.

12. The secondary battery according to claim 11, wherein the guiding portion comprises a middle section connected to the supporting portion and an inclination section connected to the middle section, the inclination section of the guiding portion is inclined with respect to the middle section, and the inclination section is attached to the connecting portion for main body.

13. The secondary battery according to claim 12, wherein each portion of the supporting piece has a minimum thickness of 0.1 mm-5 mm, and the supporting piece has a Young's elastic modulus of 1000 MPa-10000 MPa.

14. The secondary battery according to claim 1, wherein a ratio of a width of the conductive portion to a thickness of the conductive portion is in a range of 100-5000.

15. A vehicle, comprising:
a secondary battery comprising:
a top cover plate;
an electrode terminal disposed on the top cover plate;
at least one electrode assembly, wherein each of the at least one electrode assembly comprises a main body and a plurality of conductive portions extending from the main body, the plurality of conductive portions is stacked and forms a tab, and the main body is formed by winding a first electrode plate, a second electrode plate, and a separator disposed between the first electrode plate and the second electrode plate; and
a connecting piece for connecting the tab to the electrode terminal,
wherein the tab extends from a side of the main body viewed in a thickness direction of the secondary battery, and the tab is bent with respect to a height direction of the secondary battery and connected to the connecting piece.

* * * * *